Aug. 7, 1945.    S. E. HEYMANN    2,381,591
AIRCRAFT HEATING APPARATUS
Filed Sept. 22, 1941

Inventor
Seymour E. Heymann
By
Williams, Bradbury & Hinkle
Attys.

Patented Aug. 7, 1945

2,381,591

UNITED STATES PATENT OFFICE 2,381,591

AIRCRAFT HEATING APPARATUS

Seymour E. Heymann, Hollywood, Calif., assignor to Stewart-Warner Corporation, Chicago, Ill., a corporation of Virginia Application September 22, 1941, Serial No. 411,895

13 Claims. (Cl. 158—28)

My invention relates generally to heating apparatus for aircraft and the like, and more particularly to improved safety controls for such heaters.

In heating systems for aircraft, particularly military aircraft which employ heating units of the internal combustion type, it is desirable to provide safety controls to render the heater ineffective upon damage of any of its essential parts through gun fire or accident. Likewise, overheating of the heater, which might result in scorching or setting fire to or otherwise damaging adjacent parts of the aircraft, must be prevented.

The heater control system of my invention incorporates a means for rendering the heater and its fuel supply means inoperative should overheating or damage to essential parts occur.

It is therefore an object of my invention to provide an improved heating apparatus for aircraft and the like which is amply protected by safety control devices and circuits.

A further object is to provide an improved control means for aircraft heaters in which means are provided to stop the supply of fuel mixture to the heater in the event that the heater overheats, and to indicate such abnormal condition.

A further object is to provide control means for an aircraft heating system which will stop the supply of fuel to the system in the event of damage to the fuel feed line, or upon damage of other parts of the system which might result in hazardous conditions.

Figure 1:
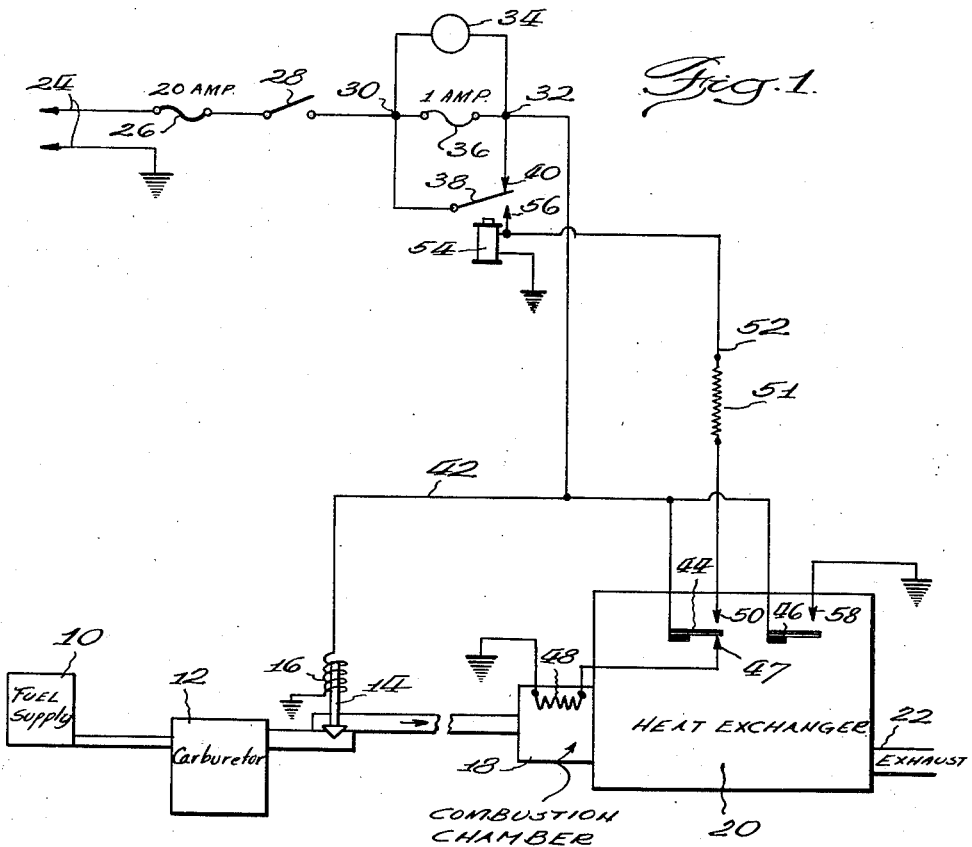
Figure 2:
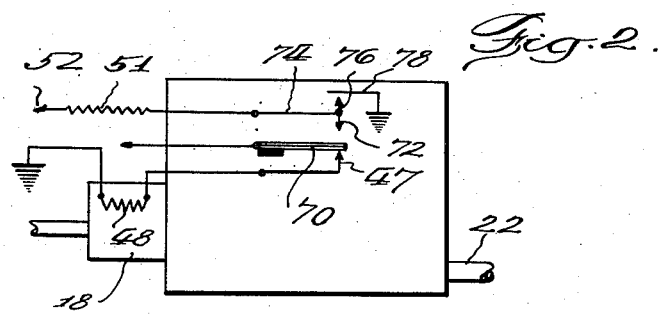

Other objects will appear from the following description, reference being had to the accompanying drawing, in which:

Fig. 1 is a wiring diagram of my improved safety control system, portions of the heating apparatus being shown diagrammatically; and, Fig. 2 is a diagram showing a modified form of a portion of the control circuit.

Referring to Fig. 1, the heating system comprises generally a fuel supply 10, which may be gasoline or other suitable fuel, feeding a carburetor 12, the outlet of which is controlled by a valve 14 which is resiliently closed and adapted to be opened upon energization of the winding of a solenoid 16. The combustible mixture supplied by the carburetor 12 flows past the valve 14 to a combustion chamber 18, which is entirely enclosed and sealed from the atmosphere, and the products of combustion of which flow through a heat exchanger 20 and thence to an exhaust pipe 22. The fuel supply 10 and carburetor 12 are illustrated as representative of any suitable means for supplying a combustible mixture to the combustion chamber 18, and instead of the fuel supply and carburetor, the heater may be supplied with a combustible mixture from the supercharger of the aircraft engine, or by any other suitable means.

The exhaust conduit may be connected to the supercharger at a point where the pressure is very low, or may pass through the fuselage wall of the aircraft and discharge to the atmosphere, preferably through a point located at a place along the fuselage where the motion of the plane causes a substantial drop in pressure. Any other suitable pressure or vacuum producing means may be utilized to cause the flow of a combustible mixture to the heater, and the discharge of the products of combustion therefrom.

The operation of the heater is electrically controlled, the controlling circuits being energized from a suitable source of current supplied through conductors 24. One of these conductors is indicated as connected to ground, while the other is connected through a relatively high amperage fuse 26 (e. g. 20 amp.) to a manually operable main control switch 28. The switch 28 is connected to a terminal 30 and the latter is connected to a terminal 32 through three parallel circuits, the first comprising a high resistance signal lamp 34, the second, a fuse 36 of relatively low amperage (e. g. 1 amp.), and the third comprising a relay switch arm 38, normally in the position shown in the drawings, in engagement with contact 40. The terminal 32 is connected to a conductor 42 which leads to one end of the winding of a solenoid 16, the other end thereof being grounded.

A pair of thermostatic bimetal switch elements 44, 46 are connected to the conductor 42. The bimetal switch element 44, when cold, is in the position in which it is shown in the drawings, in engagement with lower contact 47, which is connected to ground through resistance wire igniter 48. When the heat exchanger is heated to its normal operating temperature, the bimetal 44 will warp to move away from contact 47 and shortly thereafter engage a contact 50. The latter contact is connected through a resistance 51 and a conductor 52 to one end of a relay winding 54, which, upon energization, is adapted to swing the switch arm 38 thereof downwardly to break its connection with the contact 40 and make a connection with a lower contact 56. The other end of the relay winding 54 is connected to ground. The resistance 51 is a protective resistance, the function of which will appear more clearly from the following description of the operation of the electrical circuits.

The bimetal thermostatic switch 46, when cold, is in the position shown, but when heated, is adapted to warp upwardly to engage a grounded contact 58, such engagement taking place only when the bimetal 46 is raised to a temperature indicative of faulty operation of the heating system.

In operation, upon closure of the switch 28, current will flow to the terminal 32 through the switch arm 38 and contact 40 since this is a negligible resistance path, and as a result, the high resistance signal lamp 34 will not be illuminated. From the terminal 32, current will flow through the winding of solenoid 16 to open the valve 14, whereupon, fuel mixture may flow to the combustion chamber. Current from the terminal 32 will also flow through the bimetal switch element 44, contact 47, and through igniter 48 to ground, the igniter rapidly heating to a temperature of incandescence and igniting the fuel mixture in the combustion chamber.

After the heater has been in operation for a short length of time, the thermostatic switch 44 will warp upwardly, opening the circuit to the igniter 48 and by engagement with contact 50 closing the circuit to the relay winding 54, whereupon, the switch arm 38 will be drawn downwardly, moving away from the contact 40 and engaging contact 56, thus providing a holding circuit for the relay 54 which is independent of the position of the thermostatic switch 44. The winding of the solenoid 16 is of relatively high resistance so that the low amperage fuse 36 can readily carry the current necessary to maintain the solenoid energized. The fuse 36 is of such low resistance relative to that of the lamp 34 that the latter will not be illuminated when the relay 54 is energized.

If, because of some fault in the system, the heat exchanger should become excessively hot, the bimetal switch element 46 will warp to engage the contact 58 and thus connect terminal 32 to ground, thereby causing blowing of the fuse 36. Blowing of the fuse 36 will result in deenergization of solenoid 16, and the valve 14 will close, cutting off the fuel supply and making it impossible to restart the system until the fuse has been replaced. The signal lamp 34 will be illuminated as soon as the fuse 36 blows, but because of its high resistance the current flow through it will be insufficient to maintain the solenoid 16 energized.

Under all expected possible conditions of operation, the bimetal 44 will be in engagement with contact 50 whenever the bimetal overheat switch 46, 58 is closed. Thus, if it were not for the protective resistor 51, a path of negligible resistance from the terminal 30 to ground would be completed through the relay switch arm 38, contact 56, conductor 52, contact 50, bimetal arm 44, bimetal arm 46, and contact 58, and such negligible resistance circuit would result in blowing the high amperage fuse 26.

The resistance 51 is of such value that when the enumerated circuit is completed, there will not be sufficient current flow through the conductor 52 to cause the high amperage fuse 26 to blow or to cause deenergization of the relay 54.

If, for example, due to gun fire, the fuel mixture supply conduit between the valve 14 and the combustion chamber 18 is seriously damaged, or if the exhaust conduit 22 is perforated or broken (in systems in which it is necessary to maintain a partial vacuum in this conduit), the heater will discontinue operating normally. Means are provided to close the valve 14 and to deenergize the igniter circuit upon the occurrence of any of these accidents. Under such circumstances, the heat exchanger will become cool and the bimetal switch arm 44 will warp downwardly to engage contact 47, thus completing a circuit from the terminal 32 through the igniter 48 to ground. The igniter 48 draws more current than can be carried by the fuse 36 so that the latter will blow, thereby causing effective deenergization of the solenoid 16 and causing the signal lamp 34 to be illuminated, thereby to indicate to the operator the presence of a fault in the system.

Upon grounding of wire 42 or wire 52 or any parts which are directly connected therewith, the high amperage fuse 26 will blow, thereby rendering the entire heater system inoperative until the fault is corrected and the fuse replaced.

If desired, the circuit may be somewhat simplified by using a single bimetal arm to perform the functions of both the bimetals 44 and 46. Such circuit is shown in Fig. 2, and comprises a bimetal switch arm 70 which, when cold, engaged contact 47 and which, when heated to normal operating temperature of the heater, engages a contact 72 carried by a resilient switch arm 74. The arm 74 also carries a switch contact 76, which is adapted, when the bimetal 70 is heated to an excessively high temperature indicating faulty operation of the system, to contact with a grounded conductor 78. The switch arm 74 is connected through a resistance 51 to a conductor 52, the latter parts corresponding to the similarly numbered parts of the circuit of Fig. 1.

The bimetal switch arm 70 is connected to the terminal 32 of the control circuit of Fig. 1, it being understood that in other respects the remaining portion of the circuit of Fig. 2 is identical with that of Fig. 1. The operation of the circuit of Fig. 2 is identical with that above described with reference to Fig. 1, since the switch 76, 78 corresponds to the switch 46, 58 of Fig. 1, while the switch 70, 72 corresponds to the switch 44, 50 of Fig. 1, and the switch 70, 47 corresponds to the switch 44, 47 of Fig. 1.

From the foregoing, it will be seen that with either of the two systems for controlling the operation of the heater, any defect in the heating apparatus which tends either to cause overheating or cooling of the heat exchanger will result in blowing of the fuse 36 and closing of the valve 41, and also cause illumination of the signal lamp 38 to apprize the operator of the fault in the system. Any fault resulting in a short-circuit in the electrical control system will result in the blowing of the high amperage fuse 26 and consequent closing of the valve 44, as well as complete isolation of the electrical control system from the source of electrical energy.

While I have shown and described particular embodiments of my invention, it will be apparent to those skilled in the art that numerous variations and modifications of the apparatus may be made without departing from the underlying principles of the invention. I therefore desire, by the following claims, to include within the scope of my invention all such variations and modifications of the invention by which substantially the results of the invention may be obtained through the use of substantially the same or equivalent means.

I claim:

1. In a heating system for aircraft and the like in which combustion takes place in a combustion chamber sealed from the surrounding atmosphere, and in which fuel is supplied to the combustion chamber through a conduit, the combination of a normally closed valve in said conduit, a solenoid for opening said valve, electrically operated ignition means for igniting the fuel in the combustion chamber, a source of electrical energy, a circuit including said source and said ignition means, said circuit including a thermostatically operated means in series with said igniter and operable to open the circuit through said igniter after said combustion chamber attains a predetermined temperature, an over-load cut-out, and means operable by said thermostatic means to establish a circuit through said over-load cut-out when said thermostatic element is heated slightly beyond said predetermined temperature.

2. In a heating system for aircraft or the like in which fuel is burned in an enclosd combustion chamber and supplied thereto through a conduit, the combination of a normally closed valve in said conduit, a solenoid for opening said valve, an electrically operated igniter for igniting the fuel in said combustion chamber, a over-load circuit breaker, a normally closed electrically operated switch in parallel with said circuit breaker, a source of electrical energy, a circuit connecting said parallel switch and circuit breaker in series with said igniter and solenoid in parallel, and means responsive to the heat of combustion of fuel in said combustion chamber to disconnect said igniter from said circuit and thereafter energize said relay to open said switch, and a holding circuit for said relay completed upon energization thereof.

3. The combination set forth in claim 2 in which there is provided means for completing an additional low resistance circuit including said circuit breaker to cause operation of the latter upon the attainment of an excessively high temperature by the heater.

4. The combination set forth in claim 2 in which said temperature responsive means is effective upon attainment of an excessively high temperature to complete a low resistance circuit through said circuit breaker to cause operation of the latter and thereby to deenergize said solenoid.

5. In a heating system for aircraft and the like in which a combustible mixture is supplied to and ignited by an electrical igniter in a closed combustion chamber and the products of combustion are passed through a heat exchanger, means for controlling the operation of said system comprising a source of electrical energy; a network comprising a high resistance signal device, a low amperage fuse, and a relay switch normally connected in parallel; a relay winding which when energized opens said relay switch, a solenoid, a valve opened upon energization of said solenoid for controlling the flow of combustible mixture to said combustion chamber and the products of combustion therefrom; a first circuit including said source, said network, and said solenoid; a second circuit including said source, said network, an electrical igniter, and a thermostatic switch responsive to heat generated in said combustion chamber, said second circuit being completed by said thermostatic switch only when less than a normal qquantity of heat is being generated in said combustion chamber; a third circuit including said source, said network, said thermostatic switch, a resistor, and said relay winding, said third circuit being completed momentarily only by said thermostatic switch when substantially the normal amount of heat is being generated in said combustion chamber; a relay holding circuit including said source and relay winding and shunting said third circuit upon operation of said relay; and a fourth circuit including said source, said signal and fuse in parallel, and a switch closed in response to the generation of an abnormally excessive amount of heat in said heat generator, said fourth circuit being effective upon completion to blow said fuse, thereby to deenergize said solenoid, effectively energize said signal device, and thus to render said heater inoperative and to indicate said excessive heat condition; and said second circuit being adapted, upon its completion due to failure of normal heat generation in said combustion chamber, subsequent to the completion of said relay holding circuit, to blow said fuse and thereby deenergize said solenoid and effectively energize said signal device.

6. In a heating system for aircraft and the like, the combination of an internal combustion type heating unit, means to supply a combustible mixture of fuel and air to said unit and to withdraw the products of combustion therefrom, an electrical igniter in said unit and a circuit therefor, a source of electrical energy for said igniter, a normally closed valve for controlling the flow of the combustible mixture to said unit, a circuit including a solenoid for operating said valve, a circuit breaker effective upon overload to open the circuits including said solenoid and said igniter, thermostatic switch means to open said igniter circuit upon establishment of combustion in said unit, and means operable upon a failure of combustion and consequent closing of said thermostatic switch means to over-load said circuit breaker and thereby deenergize the circuits to said solenoid and igniter, thus to render the heater inoperative until said circuit breaker has been manually reconditioned for operation.

7. The combination set forth in claim 6 in which there is a signal means having an impedance high with respect to that of said circuit breaker and connected in parallel therewith, whereby upon overloading of said circuit breaker said signal means will be fully energized for operation.

8. In a heating system for aircraft and the like, the combination of an internal combustion type heating unit, means to supply a combustible mixture of fuel and air to said unit and to withdraw the products of combustion therefrom, an electrical igniter in said unit, a normally closed valve for controlling the supply of combustible mixture to said unit, a solenoid for opening said valve, a signal device, a circuit breaker, a relay having a switch and a holding circuit, a main switch for connecting said electrical elements to a source of electrical energy, means effective upon closure of said main switch to complete energizing circuits for said solenoid and said igniter, thermostatic means responsive to the temperature attained by said unit, said thermostatic means being effective upon attainment of normal operating temperature of said heating unit to open said igniter circuit, to energize said relay, and to establish the holding circuit of the latter, and a circuit completed upon attainment of an excessive temperature of said unit to complete a low impedance circuit through said circuit breaker, thereby to deenergize said solenoid and effectively to energize said signal device.

9. In a control system for a heater of the internal combustion type having an electrically operated fuel control valve and an electrically operated igniter, the combination of energizing circuits for said solenoid and for said igniter, a fuse and electrical signal device in parallel, the resistance of said fuse being so low with respect to that of said device that the latter will be effectively energized only upon the blowing of said fuse, a thermostat responsive to the temperature of the heater, an energizing circuit including said thermostat and igniter and shunting said fuse and signal device, a second circuit and means controlled by said thermostat to open said circuit and to condition said second circuit for completion by said thermostatic means upon cooling of the heater, said second circuit including said fuse and signal device in parallel as the only path for current flow to said igniter.

10. In a control system for a heater of the internal combustion type having an electrically operated fuel control valve and an electrically operated igniter, the combination of energizing circuits for said solenoid and for said igniter, a fuse, a thermostat responsive to the temperature of the heater, an energizing circuit including said thermostat and igniter and shunting said fuse, and means controlled by said thermostat to open said circuit and to condition a second circuit for completion by said thermostatic means upon cooling of the heater, said second circuit including said fuse as the only low resistance path for current flow to said igniter.

11. In a control system for a heater of the internal combustion type having an electrically operated fuel control valve and an electrically operated igniter, the combination of energizing circuits for said solenoid and for said igniter, an overload safety device, a thermostat responsive to the temperature of the heater, an energizing circuit including said thermostat and igniter and shunting said overload safety device, means controlled by said thermostat to open said circuit and to condition a second circuit for completion by said thermostatic means upon cooling of the heater, said second circuit including said overload safety device as the only path for current flow to said igniter, and signal means rendered effective upon operation of said overload safety device.

12. In a control system for a heater of the internal combustion type having an electrically operated fuel control valve and an electrically operated igniter, the combination of energizing circuits for said solenoid and for said igniter, a safety device operable to open a normally closed circuit therethrough upon the occurrence of an overload, a thermostat responsive to the temperature of the heater, an energizing circuit including said thermostat and igniter and shunting said safety device, a second circuit, and means controlled by said thermostat to open said energizing circuit and to condition said second circuit for completion by said thermostatic means upon cooling of the heater, said second circuit including said safety device as the only low impedance path for current flow to said igniter, said safety device operating to open the circuit therethrough when it is connected in said second circuit.

13. In a heating system for aircraft and the like in which fuel is burned in a combustion chamber sealed from the surrounding atmosphere and the fuel is supplied to the combustion chamber through a conduit, the combination of a self-closing valve in said conduit, a solenoid for opening said valve, an electrical igniter for the fuel in said combustion chamber, a manually operated switch, and electrical circuit means including a single thermostat responsive to the heat of combustion of the fuel supplied to said combustion chamber to energize said solenoid and igniter upon initial closure of said switch, to deenergize said igniter upon establishment of combustion in said combustion chamber, and to deenergize both said igniter and said solenoid upon subsequent failure of combustion or overheating of said combustion chamber.

SEYMOUR E. HEYMANN.